June 17, 1947.  H. YAMAMOTO  2,422,640
APPARATUS FOR MANUFACTURING STRAINLESS GLASS SHEETS
Filed Dec. 12, 1938
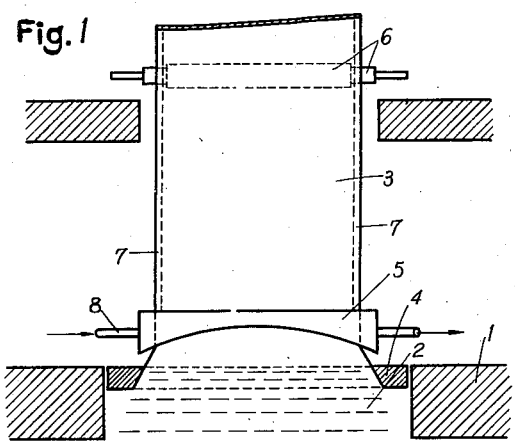
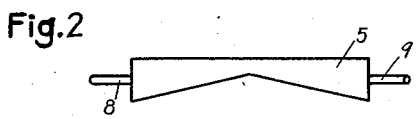
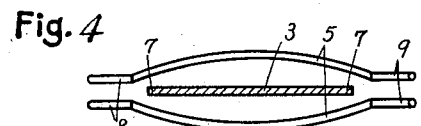
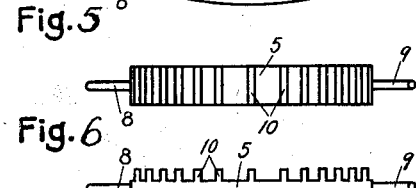
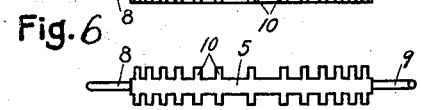
INVENTOR.
Hideo Yamamoto Patented June 17, 1947

2,422,640

UNITED STATES PATENT OFFICE 2,422,640

APPARATUS FOR MANUFACTURING STRAINLESS GLASS SHEETS

Hideo Yamamoto, Yokohama, Japan; vested in the Attorney General of the United States Application December 12, 1938, Serial No. 245,285
In Japan March 9, 1938

Sections 3 and 14, Public Law 690, August 8, 1946.
Patent expires March 9, 1958

3 Claims. (Cl. 49—17)

My invention relates to a method of manufacturing strainless glass sheets by using special cooling means, and its object is to produce sheet glass of best quality having homogeneous structure and less internal strain.

It has heretofore been known that in the Fourcault, Pittsburgh, Colburn or other sheet glass drawing methods, a glass sheet is continuously drawn from a drawing kiln into a chamber where the sheet is annealed while it is held vertically or bent horizontally and cut into a desired length. As soon as the glass sheet is drawn from the drawing kiln gradually forming hardened edges by a suitable method, the glass sheet is uniformly cooled in horizontal direction at once by coolers and solidified, thus, the reduction of breadth of sheet and shrinkage are avoided by means of surface tension. For this purpose, it has been considered to be absolutely necessary to cool the glass sheet in horizontal direction at as nearly uniform temperature as possible. If such cooling method is not applied, the breadth of the drawn sheet will be reduced and the sheet becomes wavy and is liable to break, thereby making the drawing operation difficult. Such facts can be clearly recognized from the fact that all heretofore known coolers have uniform breadth horizontally along the glass sheet or rather gradually enlarged breadth towards the center so as to provide the largest cooling effect in the central part of the sheet.

The glass sheet, however, made by using the above described cooling method, especially such a glass sheet drawn at high temperature as in the Pittsburgh process, has not only greater internal strains but also its distribution becomes non-uniform since the sheet is cooled uniformly along its breadth by the cooler and is subjected to such a severe effect that the glass sheet is very often broken while it is being drawn or when the sheet is cut off. But the cause of such failures had not been made clear and it has been considered an unavoidable result of the manufacture of glass sheets by the drawing method.

The inventor made careful investigation to find out the cause of the above defects taking various facts into consideration and discovered a new method of cooling the glass sheet which is quite contrary to the known method, viz. instead of cooling the sheet uniformly along the breadth, the coolers are so devised that the cooling effect may be gradually retarded towards the center of the sheet from both side edges. Then the internal strains of the glass sheet can be extremely reduced and distributed uniformly so that the well cuttable glass sheet of splendid quality may be obtained.

The variation of cooling effect from both side-edges is preferably made similarly, yet it is not necessary to limit the cooling effect in the center part of the sheet to the minimum, but the minimum point may be shifted somewhat to one side from the centre, if the position is not changed suddenly, then the object of this invention can be similarly attained.

The rate of cooling for the glass sheet in this invention may be adjusted in accordance with the drawing speed of the glass sheet and better results can be obtained if the cooling speed in cross-wise direction is regulated to be nearly the same as compared with the cooling speed along its drawing direction.

In carrying out my invention the most effective and simple method is to reduce the breadth or thickness or both of ordinary coolers towards the center from both sides along an arc or straight lines or step-by-step, or by curving the cooler gradually remote against the glass sheet towards the middle from both sides. The object can also be attained with the coolers of constant breadth by reducing the quantity of cooling medium or by changing the area of heat radiating surface at the middle of the glass sheet. Accordingly it should be understood that the present invention is not limited to the definite means as above described, but without departing from the spirit of this invention, other various combinations or modifications can be effectively applied. For instance, auxiliary coolers may be used in combination with ordinary coolers, and also the above cooling means may be applied to only one side of the glass sheet.

In manufacturing glass sheets by the above described method of this invention, the cooling in the cross-wise direction maintains good balance in respect of the cooling in the drawing direction of the glass sheets, viz. the sheet is cooled to the inside from the outside comparatively uniformly along the longitudinal and cross-wise directions of the glass sheet. Accordingly the sheet is not made wavy and is subjected to very few internal strains which, if any, can be uniformly distributed all over the sheet. Thus the glass sheet produced is of superior quality which can be well-cuttable and which does not break when worked for such as polishing or grinding. Such facts can easily be recognized by inspecting the sheet through a polarizer.

My invention will be better understood from the following description when considered in connection with the accompanying drawing, and its scope will be pointed out in the appended claims.

In the drawings, Fig. 1 is a front diagrammatic view, partially in section, of a glass sheet manufacturing device by the vertical drawing method, selected for the purpose of explanation of my invention; Figs. 2 and 3 are front views of coolers of different design embodying my invention; Fig. 4 is a plan view of the cooler of my invention; Figs. 5 and 6 are respectively a front elevation and plan view of a cooler illustrating a modified form of my invention.

Now referring to the drawing, 1 represents a part of the drawing kiln containing molten glass 2. 3 represents a glass sheet to be drawn through a suitable floating guide 4 and by means of rollers 6. 5 is the cooling device of my invention arranged adjacent to the glass sheet 3 above the outlet of the guide 4.

In accordance with my invention, the cooler 5 is formed as shown in Figs. 1, 2 and 3 with a gradually reduced breadth towards the middle horizontally from both ends, and/or curved as shown in Fig. 4.

A suitable fluid cooling medium, such as cold water or cold air, is supplied from the pipe 8 into the cooler 5 and is taken out through the pipe 9. Figs. 5 and 6 show another example of the cooler which is provided with heat radiating ribs 10 arranged with gradually increased intervening spaces towards the middle from both sides for equally attaining the object of this invention. In all of the coolers shown in Figs. 1 to 6, the cooling effect for the glass sheet is largest at both ends and gradually reduced towards the middle where the cooling effect is smallest. With the above devices, the glass sheet 3 drawn through the floating guide 4 is cooled at both side edges more rapidly than the other parts and forms the hardened edges 7 at first. Thus the molten glass film is extended between the hardened edges 7 as the glass sheet is drawn gradually and cooled towards the middle from both edges with the reduced effect so that the cooling effects in the horizontal and vertical directions of the glass sheet maintain the balance to facilitate the manufacture of strainless glass sheet.

I claim:

1. Apparatus for manufacturing strainless glass sheets by vertically drawing the molten glass out of a drawing kiln, comprising coolers disposed on both sides of the sheet drawing position and above and adjacent to the normal glass level of the kiln, each of said coolers extending the full width of the glass sheet, each cooler diminishing in vertical extent from the ends thereof toward the middle to provide reduced cooling effect towards the middle of the sheet from both side edges, and each cooler being so positioned that the middle portion thereof is spaced farther from the normal glass level of the kiln than the ends.

2. Apparatus for manufacturing strainless glass sheets by vertically drawing the molten glass out of a drawing kiln, comprising a plurality of coolers positioned adjacent to and above the normal glass level of the kiln and on both sides of the sheet drawing position, each of said coolers extending the full width of the sheet and having gradually reduced breadth of the cooling surface exposed to the sheet being drawn, said breadth diminishing toward the middle thereof from both ends, the middle portions of each of said coolers being curved upwards and said coolers being so positioned as to provide a greater space between the lower edges thereof and the normal glass level of the kiln at the center than at the ends thereof.

3. A cooling means for use in the manufacture of glass sheets by the vertical drawing method, said cooling means comprising two symmetrically disposed coolers including fluid circulating means positioned above and adjacent to the normal glass level of the kiln one on each side of the drawing position for conducting heat away from the faces of the sheet being drawn, each of said coolers extending the full width of the glass sheet and being shaped to provide a lesser cooling area at the middle thereof, which cooling area gradually increases toward its ends, and each of said coolers also being shaped to provide a greater space between itself and the normal position of the glass sheet at the center than at the edges of the sheet drawing position, whereby the cooling effect across the glass sheet when being drawn is smallest at the middle and gradually increases toward both edges.

HIDEO YAMAMOTO.

REFERENCES CITED

The following references are of record in the file of this patent:

UNITED STATES PATENTS

| Number | Name | Date |
|---|---|---|
| 1,698,492 | Drake | Jan. 8, 1929 |
| 1,811,125 | Halbach | June 23, 1931 |
| 966,652 | Colburn | Aug. 9, 1910 |
| 1,688,530 | Drake | Oct. 23, 1928 |
| 1,136,290 | Stupakoff | Apr. 20, 1915 |